(12) United States Patent
Rofougaran et al.

(10) Patent No.: US 9,154,196 B2
(45) Date of Patent: Oct. 6, 2015

(54) WIRELESS COMMUNICATION DEVICE FRONT END AND DISTRIBUTED ANTENNA SYSTEM

(71) Applicant: BROADCOM CORPORATION, Irvine, CA (US)

(72) Inventors: Ahmadreza Rofougaran, Newport Coast, CA (US); Alireza Tarighat Mehrabani, Irvine, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 36 days.

(21) Appl. No.: 14/041,695

(22) Filed: Sep. 30, 2013

(65) Prior Publication Data

US 2015/0072629 A1    Mar. 12, 2015

Related U.S. Application Data

(60) Provisional application No. 61/875,888, filed on Sep. 10, 2013.

(51) Int. Cl.
*H04B 1/40*   (2015.01)
*H04B 7/04*   (2006.01)
*H04B 1/401*  (2015.01)

(52) U.S. Cl.
CPC .............. *H04B 7/0404* (2013.01); *H04B 1/401* (2013.01)

(58) Field of Classification Search
USPC ........ 455/550.1, 561, 562.1, 101, 272, 276.1, 455/277.1, 277.2, 73, 78, 88
See application file for complete search history.

(56) References Cited

U.S. PATENT DOCUMENTS

| 5,513,176 | A  | * | 4/1996  | Dean et al. ................. 455/276.1 |
| 6,807,401 | B2 | * | 10/2004 | Boyle ............................ 455/101 |
| 7,792,548 | B2 | * | 9/2010  | Rofougaran ............... 455/562.1 |
| 8,095,185 | B2 | * | 1/2012  | Stephenne ................ 455/562.1 |

* cited by examiner

*Primary Examiner* — Thanh Le
(74) *Attorney, Agent, or Firm* — Garlick & Markison; Bruce E. Garlick

(57) ABSTRACT

A wireless communication device front end includes power amplifiers, low noise amplifiers, and a distributed antenna system. The distributed antenna system includes antennas and an antenna coupling circuit. The antenna coupling circuit receives an outbound signal of a first wireless communication from a power amplifier and sends first and second components of the outbound signal to first and second antennas. The antenna coupling circuit also receives an inbound signal of a second wireless communication from a third antenna and sends the inbound signal to a low noise amplifier. The third antenna is a distance from the first antenna and from the second antenna such that, in air, the outbound signal is attenuated at the third antenna.

20 Claims, 7 Drawing Sheets

| | time slot 1 | time slot 2 | time slot 3 | time slot 4 | time slot 5 | time slot 6 | time slot 7 | time slot 8 | time slot 9 |
|---|---|---|---|---|---|---|---|---|---|
| ant. 0 | | | | | | | | | |
| ant. 1 | WLAN TX @ f1 | | WLAN TX @ f1 | WLAN TX @ f1 | | WLAN TX1 @ f1 | WLAN TX @ f1 | WLAN TX @ f1 | BT RX @ f1 |
| ant. 2 | WLAN TX @ f1 | | WLAN TX @ f1 | WLAN TX @ f1 | | WLAN TX1 @ f1 | WLAN TX @ f1 | WLAN TX @ f1 | WLAN TX @ f1 |
| ant. 3 | BT RX @ f1 | | BT RX @ f1 | WLAN RX @ f1 | BT RX1 @ f1 | BT1 RX @ f1 | WLAN RX @ f1 | BT RX @ f1 | WLAN TX @ f1 |
| ant. 4 | | | | | WLAN TX @ f1 | | WLAN TX @ f1 | WLAN TX @ f1 | BT RX @ f1 |
| ant. 5 | | | | | WLAN TX @ f1 | | WLAN TX @ f1 | WLAN TX @ f1 | WLAN TX @ f1 |
| ant. 6 | | BT RX @ f2 | BT RX @ f2 | | BT RX2 @ f1 | BT2 RX @ f1 | WLAN RX @ f1 | WLAN RX @ f1 | WLAN RX @ f1 |
| ant. 7 | | WLAN TX @ f2 | WLAN TX @ f2 | | | WLAN TX2 @ f1 | | | BT TX @ f1 |
| ant. 8 | | WLAN TX @ f2 | WLAN TX @ f2 | | | WLAN TX2 @ f1 | | | BT TX @ f1 |

FIG. 7

WIRELESS COMMUNICATION DEVICE FRONT END AND DISTRIBUTED ANTENNA SYSTEM

CROSS REFERENCE TO RELATED PATENTS

The present U.S. Utility patent application claims priority pursuant to 35 U.S.C. §119(e) to the following U.S. Provisional patent application which is hereby incorporated herein by reference in its entirety and made part of the present U.S. Utility patent application for all purposes:

1. U.S. Provisional Application Ser. No. 61/875,888, entitled "WIRELESS COMMUNICATION DEVICE FRONT END AND DISTRIBUTED ANTENNA SYSTEM," filed Sep. 10, 2013.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND

1. Technical Field

The present disclosure relates generally to wireless communications and more particularly to a distributed antenna system for a wireless communication devices.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system operates in accordance with one or more communication standards. For instance, wireless communication systems may operate in accordance with one or more standards including, but not limited to, IEEE 802.11, Bluetooth, global system for mobile communications (GSM), code division multiple access (CDMA), local multi-point distribution systems (LMDS), radio frequency identification (RFID), Enhanced Data rates for GSM Evolution (EDGE), General Packet Radio Service (GPRS), WCDMA, LTE (Long Term Evolution), WiMAX (worldwide interoperability for microwave access), and/or variations thereof.

Depending on the type of wireless communication system, a wireless communication device, such as a cellular telephone, two-way radio, personal digital assistant (PDA), personal computer (PC), laptop computer, computer tablet, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system or a particular RF frequency for some systems) and communicate over the channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. As is also known, the transmitter includes a data modulation stage, one or more intermediate frequency stages, and a power amplifier.

To implement a radio transceiver, a wireless communication device includes a plurality of integrated circuits (ICs) and a plurality of discrete components. For example, a wireless communication device that supports 2G, 3G, and/or 4G cellular telephone protocols includes a baseband processing IC, a power management IC, a radio transceiver IC, a transmit/receive (T/R) switch, an antenna, and a plurality of discrete components. The discrete components include surface acoustic wave (SAW) filters, power amplifiers, duplexers, inductors, and capacitors. Such discrete components add several dollars (US) to the bill of material for the wireless communication device, but are necessary to achieve the strict performance requirements of the 2G, 3G, and/or 4G protocols.

BRIEF DESCRIPTION OF THE SEVERAL VIEWS OF THE DRAWING(S)

FIG. 7 is a diagram of an example of a table for allocation time slots to antennas of a distributed antenna system in accordance with the present disclosure.

DETAILED DESCRIPTION

Figure 1:
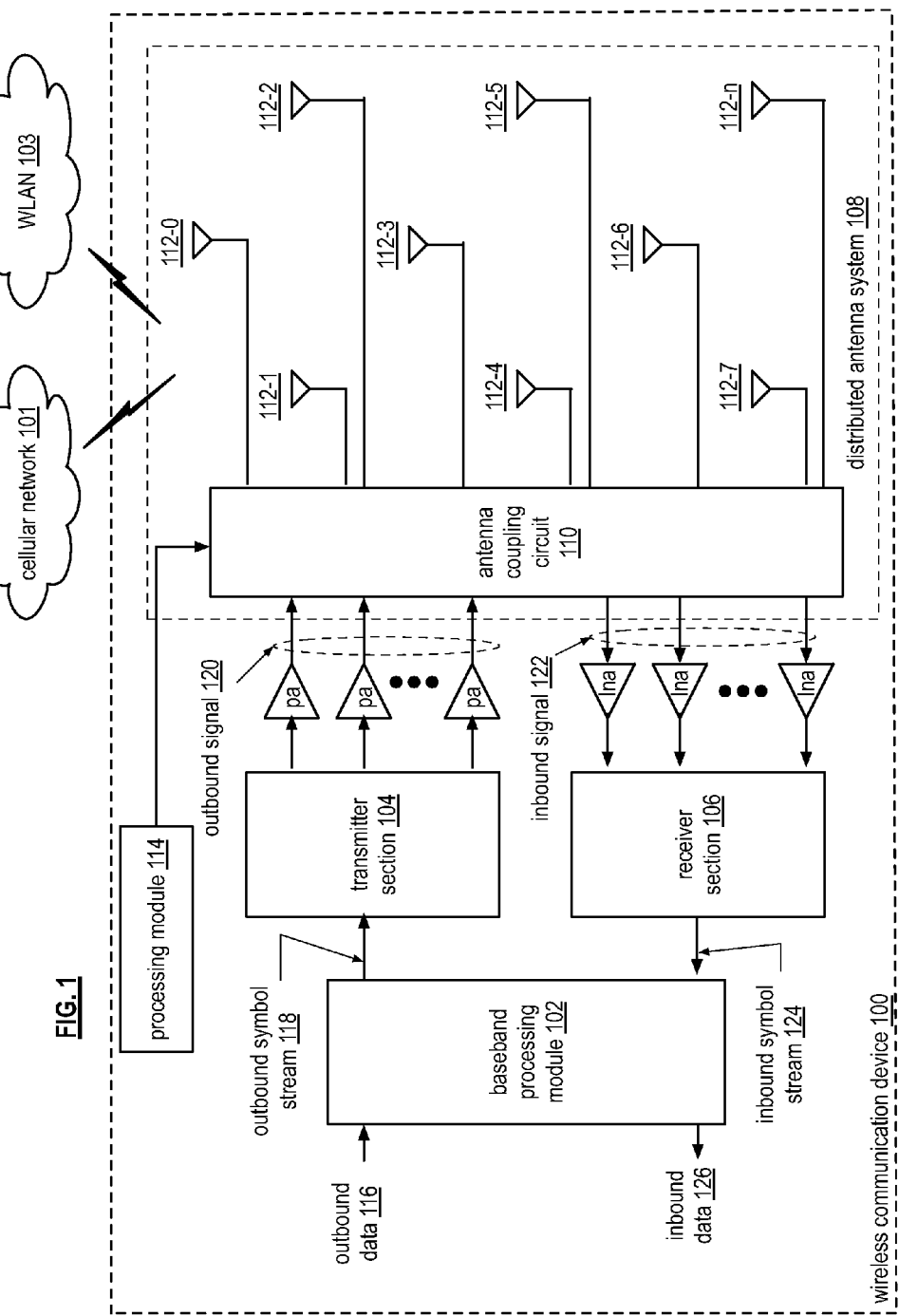
FIG. 1 is a schematic block diagram of an embodiment of a wireless communication device in accordance with the present disclosure.

FIG. 1 is a schematic block diagram of an embodiment of a wireless communication device 100 that includes a processing module 114, a baseband processing module 102, a transmitter section 104, a receiver section 106, power amplifiers (pa), low noise amplifiers (lna), and a distributed antenna system 108. The distributed antenna system 108 includes an antenna coupling circuit 110 and a plurality of antennas 112-0 through 112-n. The antennas 112-0 through 112-n may be one or more of a dipole antenna, a monopole antenna, a helical antenna, a spiral antenna, a planar antenna, etc. In addition, the antennas are physically distributed in a pattern within the wireless communication device and have a distance, or multiple distances, between them. The distance(s) corresponds to a fraction of a wavelength of a carrier frequency within a frequency band or a multiple of the fraction (e.g., $\pi$, $3\pi$, etc.).

The wireless communication device 100 may be a portable device, which may be any device that can be carried by a person, can be at least partially powered by a battery, and/or performs one or more software applications. For example, a portable device may be a cellular telephone, a laptop computer, a personal digital assistant, a video game console, a video game player, a personal entertainment unit, a tablet computer, etc. In addition, the wireless communication device 100 may operate in the radio frequency (RF) frequency band spectrum and/or the millimeter wave (MMW) frequency band spectrum, and communicate via the cellular network 101 and/or the WLAN network. The device 100 may further include a semiconductor substrate (e.g., silicon substrate, CMOS substrate, etc.) that supports at least a portion of the antenna coupling circuit, the power amplifiers (pa), and the noise amplifiers (lna).

In an example of operation, the wireless communication device 100 is enabled to concurrently support two wireless communications. The two wireless communications may be separate full duplex or half duplex communications of differing protocols (e.g., WLAN, Bluetooth, cellular, etc.) that use the same or similar carrier frequencies within one or more frequency bands (e.g., 2.4 GHz for WLAN and Bluetooth). Alternatively, the two wireless communications may be a transmit communication and a receive communication of the same full duplex protocol specific communication (e.g., transmit via a first channel of a plurality of channels for the protocol specific communication and receive via a second channel of the channels, where the first and second channels have the same channel or adjacent channels). Within the wireless communication device, the baseband processing module 102 converts, for one of the two wireless communications, outbound data 116 (e.g., voice, text, audio, video, graphics, etc.) into one or more outbound symbol streams 118 in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), etc.). Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion. Note that the baseband processing module 102 converts the outbound data 116 into a single outbound symbol stream 118 for Single Input Single Output (SISO) communications and/or for Multiple Input Single Output (MISO) communications and converts the outbound data 116 into multiple outbound symbol streams 188 for Single Input Multiple Output (SIMO) and Multiple Input Multiple Output (MIMO) communications.

The baseband processing module 102 provides the outbound symbol stream(s) 118 to an up conversion circuit of the transmit section 104, which converts the outbound symbol stream(s) 118 into one or more up converted signals (e.g., signals in one or more frequency bands 800 MHz, 1800 MHz, 1900 MHz, 2000 MHz, 2.4 GHz, 5 GHz, 60 GHz, etc.). The up conversion circuit may have a direct conversion topology or a super-heterodyne topology and may include discrete digital components and/or analog circuitry. In addition, the up conversion circuit may receive and process the outbound symbol stream(s) 118 as Cartesian coordinates, as polar coordinates, and/or as hybrid polar-Cartesian coordinates.

A transmit (TX) output circuit of the transmitter section 104 receives the one or more up converted signals and provides them to one or more of the power amplifiers (pa). The transmit output circuit may include a splitter for providing an up converted signal to multiple power amplifiers such that, when the signals are transmitted, they are combined in air, which increases the transmit power. In this manner, one or more of the expensive discrete components (e.g., surface acoustic wave (SAW) filters, off-chip power amplifiers, duplexers, inductors, and/or capacitors) may be omitted. In addition, or in the alternative, the transmit output circuit may include one or more phase shift circuits to phase shift the one or more up converted signals to facilitate beamforming. The transmit output circuit may further include, or include in the alternative, a polar coordinate drive to facilitate polar coordinate outbound signals.

Regardless of the specific implementation of the transmit output circuit, one or more power amplifiers receives the up-converted signal(s) and amplifies them to produce outbound signal(s) 120. The power amplifier(s) provide the outbound signal(s) 120 to the antenna coupling circuit 110. For an outbound signal 120, the antenna coupling circuit 110 produces first and second components of the outbound signal 120. The antenna coupling circuit 110 provides the first component of the outbound signal to a first antenna and provides the second component of the outbound signal (e.g., a first wireless communication) to a second antenna for transmission.

In addition, the antenna coupling circuit 110 receives an inbound signal of a second wireless communication from a third antenna. The third antenna is the distance from the first antenna and from the second antenna such that, in air, the outbound signal is attenuated at the third antenna. For example, if the first component is a non-inverting representation of the outbound signal, the second component is an inverting representation of the outbound signal, and the distance between the third antenna and each of the first and second antennas is one-half wavelength of the carrier frequency of the outbound signal, then, at the third antenna, the first and second components (e.g., the inverting and non-inverting representations) are 180 degrees out of phase and effectively cancel each other (e.g., provide at least 10 dB of attenuation of the outbound signal at the third antenna).

The antenna coupling circuit 110 provides the inbound signal(s) 122 to one or more of the low noise amplifiers, which amplify the inbound signal(s) to produce amplified inbound signal(s). The low noise amplifier(s) provide the amplified inbound signal(s) to a receive (RX) input circuit of the receiver section 106, which is a complimentary circuit to the transmit output circuit of the transmitter section. For instance, if the transmit output circuit includes a splitter, the receive input circuit includes a combiner.

The receive input circuit provides the inbound signal to a down conversion circuit of the receiver section, which converts the inbound signal into one or more inbound symbol streams 124. The down conversion circuit may have a direct conversion topology or a super-heterodyne topology and may include discrete digital components and/or analog circuitry. In addition, the down conversion circuit may receive and process the inbound signals as Cartesian coordinates, as polar coordinates, and/or as hybrid polar-Cartesian coordinates.

The baseband processing module 102 converts the inbound symbol stream(s) 124 into inbound data 126 (e.g., voice, text, audio, video, graphics, etc. of the second wireless communication) in accordance with one or more wireless communication standards. Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling. Note that the baseband processing module 102 converts a single inbound symbol stream 124 into the inbound data 126 for Single Input Single Output (SISO) communications and/or for Multiple Input Single Output (MISO) communications and converts multiple inbound symbol streams 124 into the inbound data 126 for Single Input Multiple Output (SIMO) and Multiple Input Multiple Output (MIMO) communications.

Figure 2:
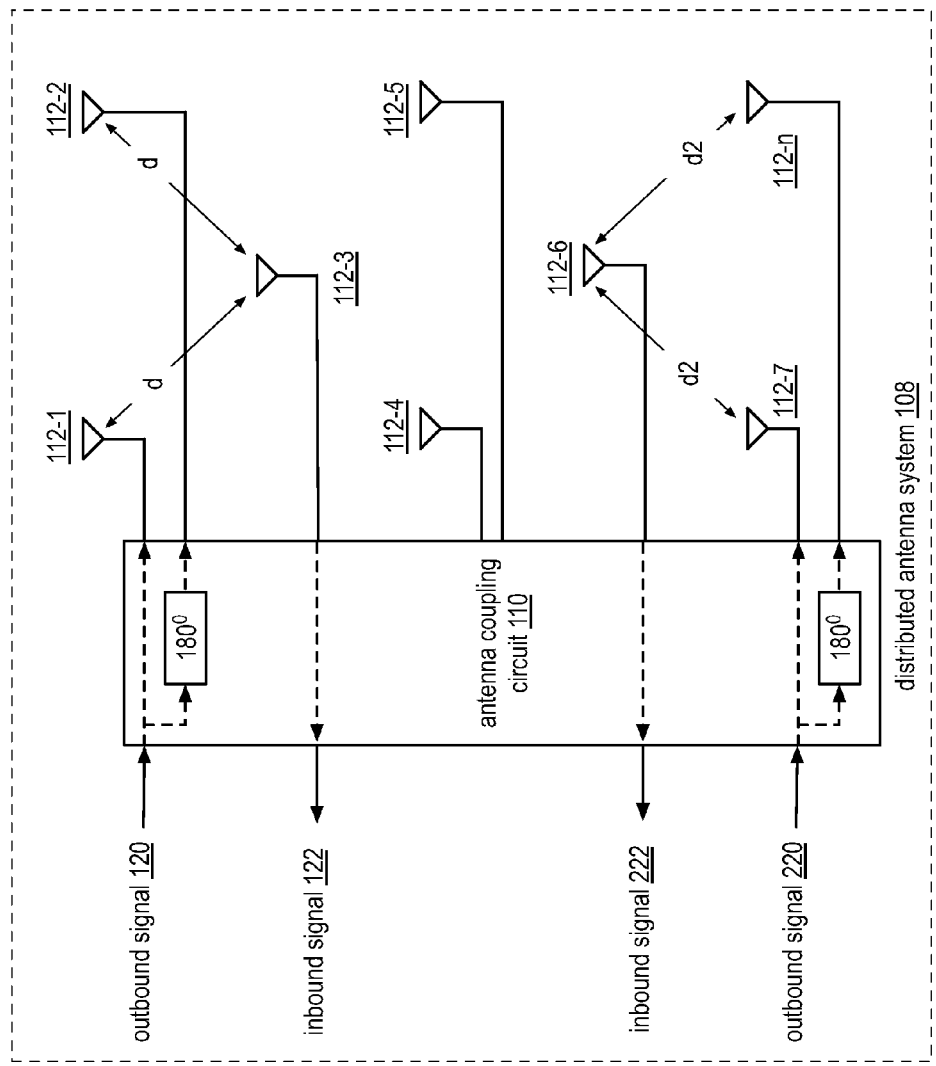
FIG. 2 is a schematic block diagram of an embodiment of a distributed antenna system in accordance with the present disclosure.

FIG. 2 is a schematic block diagram of an embodiment of a distributed antenna system 108 that includes the antenna coupling circuit 110 and the plurality of antennas 112-1 through 112-n. The antenna coupling circuit 110 includes high frequency switches and one or more 180 degree phase shift modules. The switches allow the antenna coupling circuit 110 to couple, in a variety of configurations, the power amplifiers and low noise amplifiers to the antennas. The antenna coupling circuit 110 may further include one or more antenna tuning circuits, one or more impedance matching circuits, one or more beamforming phase shift circuit, etc.

For example, the antenna coupling module 110 couples the outbound signal 120 of a first wireless communication to first and second antennas 112-1 and 112-2. The coupling to the second antenna 112-2 is via a 180 degree phase shift module. If the outbound signal is a differential signal, then the 180 degree phase shift module may be bypassed. In addition, the antenna coupling circuit 110 couples the inbound signal of a second wireless communication to a third antenna 112-3. The first and second wireless communications may be transmit and receive portions of a specific protocol communication (e.g., WLAN, cellular, etc.). Alternatively, the first wireless communication may be a transmit portion of one specific protocol communication (e.g., WLAN) and the second wireless communication may be a receive portion of another specific protocol communication (e.g., Bluetooth), or vise versa.

As shown, the third antenna 112-3 is a distance (d) from each of the first and second antennas 112-1 and 112-2. The distance corresponds to a fraction of a wavelength of a carrier frequency of the inbound and outbound signals 120 and 122. For example, if the carrier frequency for the inbound and outbound signals is 2400 MHz, then the wavelength is 12.5 cm (i.e., $(3\times10^8$ m/s$)/(2.4\times10^9$ c/s$)=12.5$ cm). The distance (d) is a fraction of the wavelength or a multiple thereof (e.g., ½, 3/2, 5/2, etc.) such that, at the third antenna, the zero degree and 180 degree representations of the outbound signal 120 substantially cancel each other.

As another example, the antenna coupling module 110 couples another outbound signal 220 of a third wireless communication to fourth and fifth antennas 112-7 and 112-n. The coupling to the fifth antenna 112-n is via a 180 degree phase shift module. If the outbound signal is a differential signal, then the 180 degree phase shift module may be bypassed. In addition, the antenna coupling circuit 110 couples the inbound signal of a fourth wireless communication to a sixth antenna 112-6. The third and fourth wireless communications may be transmit and receive portions of a specific protocol communication (e.g., WLAN, cellular, etc.). Alternatively, the third wireless communication may be a transmit portion of one specific protocol communication (e.g., WLAN) and the fourth wireless communication may be a receive portion of another specific protocol communication (e.g., Bluetooth), or vise versa. As yet another alternative, the first-fourth wireless communications may be a specific protocol MIMO communication.

As shown, the sixth antenna 112-6 is a distance (d2) from each of the fourth and fifth antennas 112-7 and 112-n. The distance (d2) corresponds to a fraction of a wavelength of a carrier frequency of the inbound and outbound signals 220 and 222. The distance (d2) may be the same as distance (d) for supporting MIMO communications and multiple concurrent differing protocol communications. Alternatively, the distance (d2) may be different than the distance (d) for supporting different communication in different frequency bands (e.g., 2.4 GHz, 5 GHz, etc.).

Figure 3:
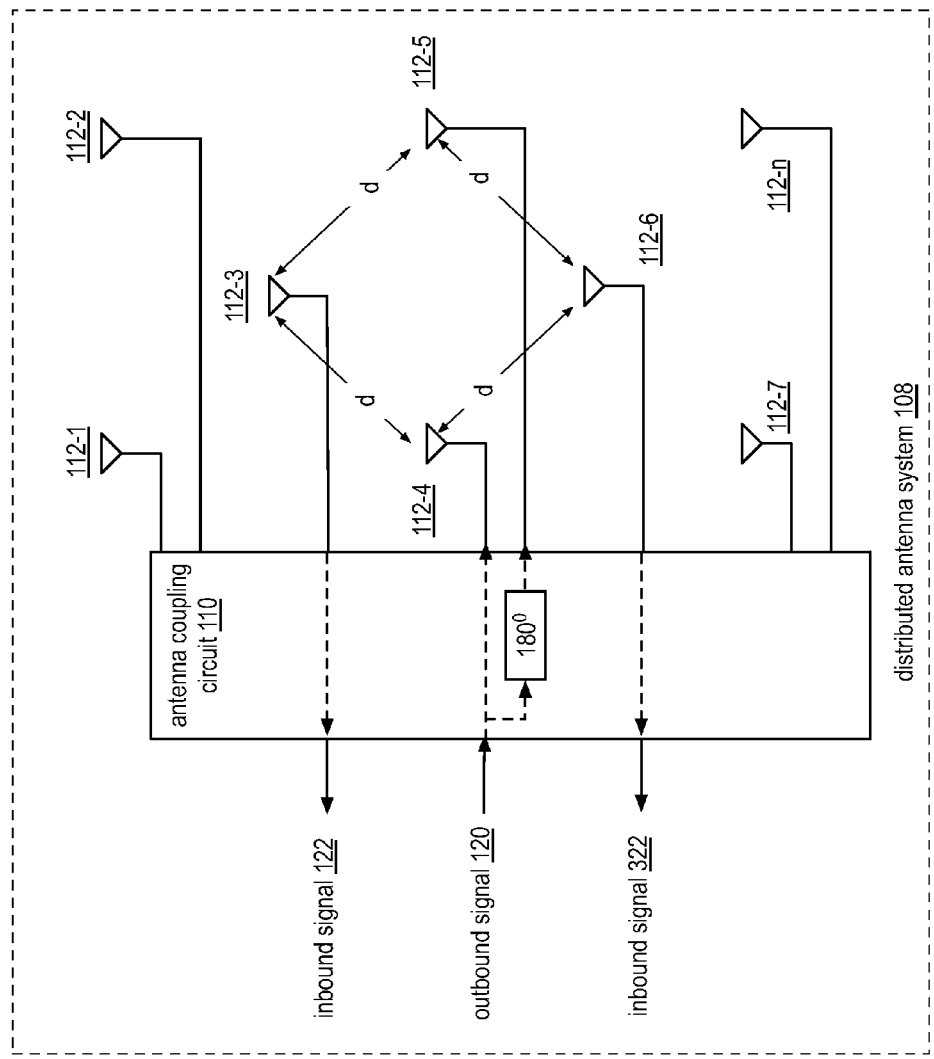
FIG. 3 is a schematic block diagram of another embodiment of a distributed antenna system in accordance with the present disclosure.

FIG. 3 is a schematic block diagram of another embodiment of a distributed antenna system 108 that includes the antenna coupling circuit 110 and the plurality of antennas 112-1 through 112-n. In this example embodiment, the antenna coupling circuit couples a non-inverting representation and an inverting representation of the outbound signal 120 to two antennas 112-4 and 112-5 and couples the inbound signals 122 to antenna 112-3. The antenna 112-3 is a distance (d) for the two antennas 112-4.

The antenna coupling circuit 110 further couples a second inbound signal 322 to fourth antenna 112-6, which is the distance (d) from the first and second antennas 112-4 and 112-5. The second inbound signal 322 is a third wireless communication, which may be an inverted representation of the inbound signal 122, may be a receive portion of a specific protocol communication and the outbound signal 120 is the transmit portion of the specific protocol communication, or may be a receive portion of a separate specific protocol communication.

Figure 4:
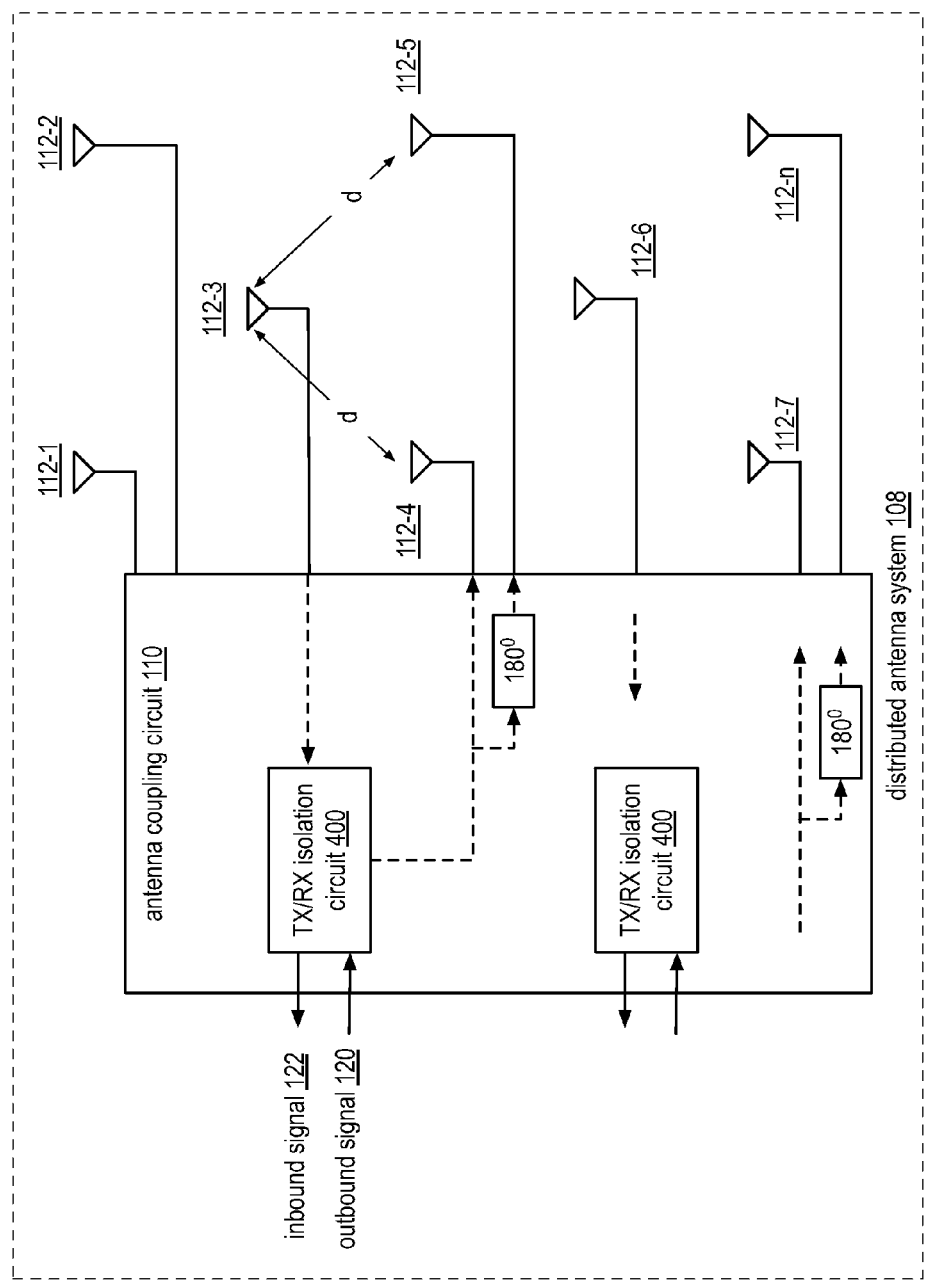
FIG. 4 is a schematic block diagram of another embodiment of a distributed antenna system in accordance with the present disclosure.

FIG. 4 is a schematic block diagram of another embodiment of a distributed antenna system 108 that includes the antenna coupling circuit 110 and the plurality of antennas 112-1 through 112-n. The antenna coupling circuit 110 further includes one or more transmit/receive isolation circuits 400. The antenna coupling circuit 110 may utilize a transmit/receive (TX/RX) isolation circuit 400 when further isolation (i.e., more than the distance (d) provides) is needed between the inbound signal 122 and the outbound signal 120.

In an example of operation, the antenna coupling circuit 110 couples the inbound and outbound signals to the TX/RX isolation circuit 400, couples a transmit output of the TX/RX isolation circuit as a non-inverting representation and an inverting representation of the outbound signal 120 to two antennas 112-4 and 112-5, and couples a receive input of the TX/RX isolation circuit 400 for the inbound signals 122 to antenna 112-3. In this example, the distance (d) provides the isolation as discussed above and the TX/RX isolation circuit 400 provides further isolation (e.g., 20 dB or more).

Figure 5:
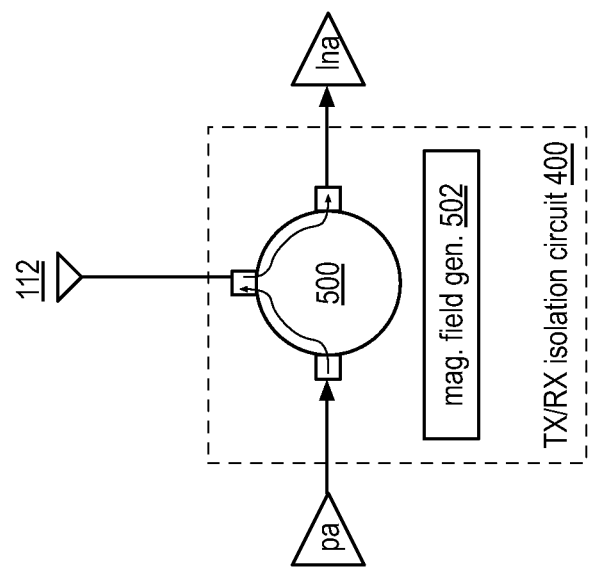
FIG. 5 is a schematic block diagram of an embodiment of a transmit/receive isolation circuit in accordance with the present disclosure.

FIG. 5 is a schematic block diagram of an embodiment of a transmit/receive isolation circuit 400 that includes a magnetic field biased circulator. The magnetic field biased circulator includes a circulator 500 and a magnetic field generator 502. The circulator 500 may be a waveguide implemented on one or more layers a substrate (e.g., integrated circuit (IC) die, IC package substrate, printed circuit board, etc.) having three ports. The magnetic field generator 502 is positioned above or below the circulator 500 and generates a magnetic field that allows electromagnetic signals to flow easily from port to port in one direction through the circulator 500 and substantially restricts the flow of the electromagnetic signals from port to port in the opposite direction.

In this example, the magnetic field generator 502 generates a magnetic field within the circulator 500 that allows electromagnetic signals to flow in clockwise direction. As shown, the power amplifier is coupled to a first port, the antenna 112 is coupled to a second port, and the low noise amplifier is coupled to a third port, where the ports are sequential in the clockwise direction. Thus, the outbound signal flows from the first port to the second port and the inbound signal flows from the second port to the third port with acceptable levels of isolation from the outbound signal (e.g., 20 dB or more isolation).

Figure 6:
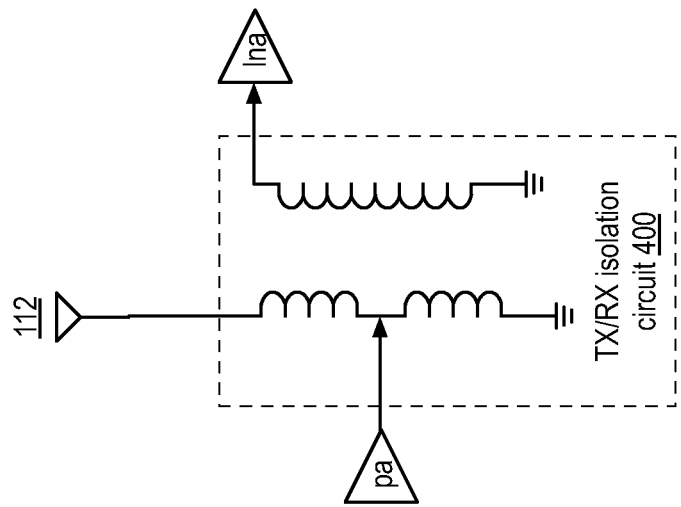
FIG. 6 is a schematic block diagram of another embodiment of a transmit/receive isolation circuit in accordance with the present disclosure.

FIG. 6 is a schematic block diagram of another embodiment of a transmit/receive isolation circuit 400 includes a transformer. The transformer includes a center-tapped first winding and a second winding. A first end of the center-tapped first winding is coupled to an antenna 112. A center-tap of the center-tapped first winding is coupled to the power amplifier and the other end of the center-tapped first winding is coupled to ground or to an adjustable impedance matching circuit. The second winding is coupled to the low noise amplifier, which may be done in a single-ended mode as shown or in a different mode (both ends of the second winding are inputs to a differential low noise amplifier).

In an example of operation, the power amplifier provides an outbound signal to the center tapped winding, where the current is split between the two legs of the center-tapped winding. The currents create opposite direction magnetic fields for the second winding and thus are substantially cancelled. An inbound signal received by the antenna 112 is provided to the center tapped winding. The current of the inbound signal on the center-tapped winding is magnetically coupled to the second winding and provided to the low noise amplifier.

FIG. 7 is a diagram of an example of a table for allocating time slots to antennas of a distributed antenna system 108. The table includes columns for time slots, which may be in accordance with a communication protocol, a proprietary protocol, or an ad hoc protocol. The table also includes a row for each of the antennas in the distributed antenna system 108. As such, an antenna from time slot to time slot (or groups of time slots to groups of time slots) may be allocated to a different wireless communication.

During a first time slot, two antennas (ant. 1 and 2) are allocated for a WLAN transmission using a first frequency (e.g., one or more channels within a frequency band). A third antenna (ant. 3) is allocated for a Bluetooth reception using the first frequency. An example of this is discussed in greater detail with reference to FIG. 2.

In a second time slot, two different antennas (ant. 7 and 8) are allocated for another WLAN transmission using a second frequency (e.g., one or more different channels within the same frequency band as the first frequency or one or more channel in a different frequency band). A third antenna (ant. 6) is allocated for a Bluetooth reception using the second frequency. In time slot 3, the antenna allocations of time slots 1 and 2 are concurrently allocated.

During time slot 4, two antennas (ant 1 and 2) are allocated for a WLAN transmission using the first frequency. A third antenna (ant 3) is allocated for a WLAN reception using the first frequency. This configuration supports full duplex WLAN communication using the first frequency (e.g., the same channel or different channels). While shown for WLAN, this time slot configuration could be for a Bluetooth communication.

The fifth time slot has antennas 4 and 5 allocated for a WLAN transmission using the first frequency. A third antenna is allocated for a Bluetooth reception using the first frequency. In addition, a fourth antenna is allocated for a second Bluetooth reception using the first frequency. The sixth time slot has antennas 1 and 2 allocated for a WLAN transmission using the first frequency, the third antenna assigned for a Bluetooth reception using the first frequency, antennas 7 and 8 allocated for a second WLAN transmission using the first frequency, and antenna 6 allocated for a second Bluetooth reception.

The seventh time slot is set up for a 2×2 MIMO communication or for a beamforming communication. In this configuration, a first outbound signal component is transmitted via antennas 1 and 2 and a second outbound signal component is transmitted via antennas 4 and 5. A first inbound signal component is received by antenna 3 and a second inbound signal component is receive by antenna 6. Since the transmit signal components use the first frequency, their signals cancel in air at antennas 3 and 6.

The eighth time slot is set up to support a beamforming WLAN transmission via antennas 1, 2, 4, and 5, a WLAN reception via antenna 6, and two Bluetooth receptions via antennas 0 and 3. The ninth time slot is set up to support the same communications as time slot with the addition of a Bluetooth transmission via antennas 7 and 8.

Figure 8:
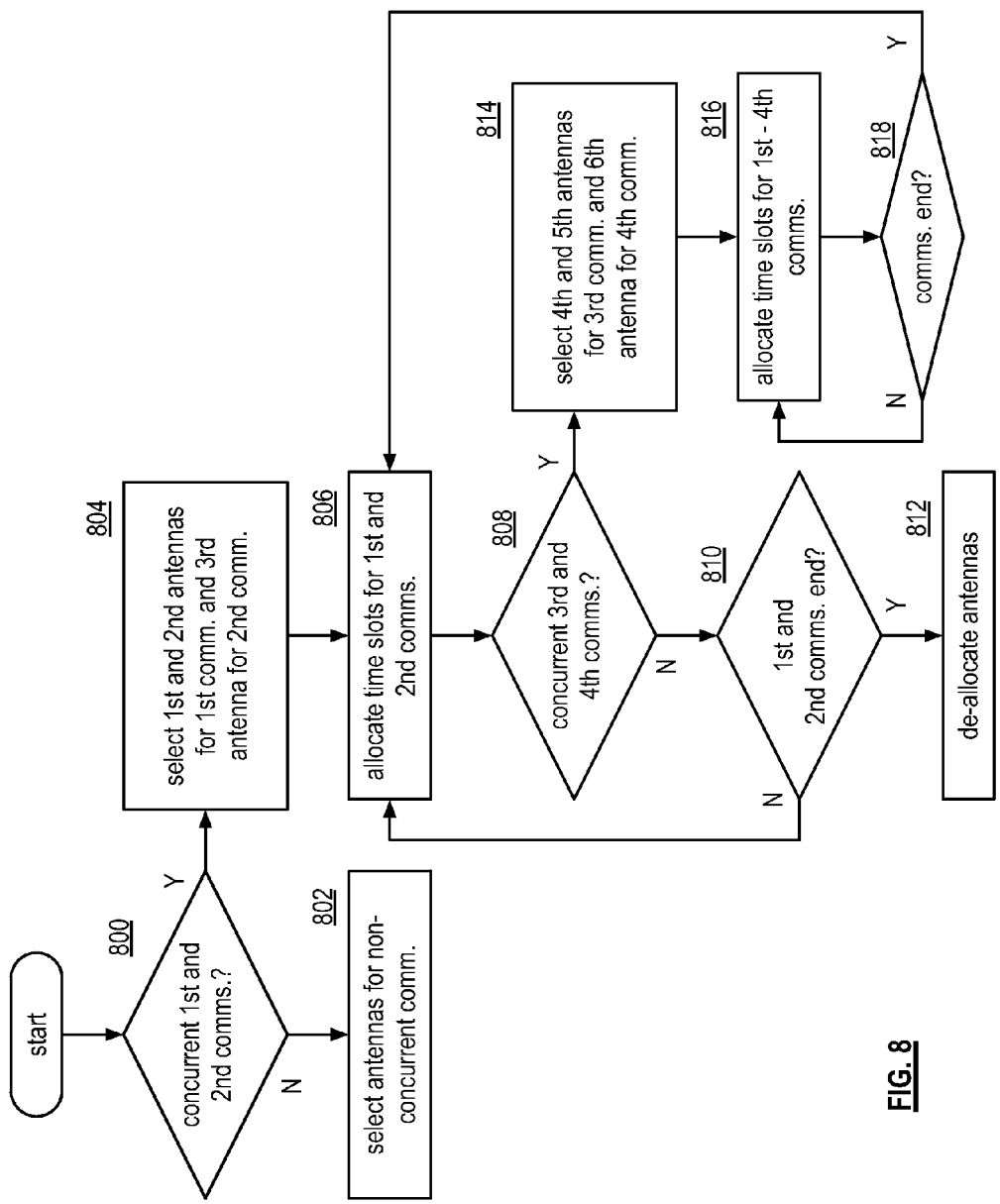
FIG. 8 is a logic diagram of an example of a method for operating a wireless communication device having a distributed antenna system in accordance with the present disclosure.

FIG. 8 is a logic diagram of an example of a method for operating a wireless communication device having a distributed antenna system. The method begins at step 800 where a processing module (e.g., processing module 104 and/or the baseband processing module 102) of the wireless communication determines whether the wireless communication device is to concurrently support a first wireless communication and a second wireless communication. In an example, the first wireless communication is in accordance with a wireless local area network (WLAN) protocol and the second wireless communication is in accordance with a Bluetooth protocol. As another example, the first wireless communication is a transmit portion of a protocol specific communication on a first channel and the second wireless communication is a receive portion of the protocol specific communication on a second channel.

When the wireless communication device is not to concurrently support the first and second wireless communications, the method continues at step 802 where the processing module selects an antenna configuration for a non-concurrent communication (i.e., selects the antenna configuration support the first wireless communication or to support the second wireless communication). When the wireless communication is to concurrently support the first and second wireless communications, the method continues at step 804 where the processing module selects a first antenna to transmit a first component of an outbound signal of the first wireless communication, a second antenna to transmit a second component of the outbound signal of the first wireless communication, and a third antenna to receive an inbound signal of a second wireless communication. The selection of the antennas is done such that the third antenna is a distance from the first antenna and from the second antenna such that, in air, the outbound signal is attenuated at the third antenna.

The method continues at step 806 where the processing module allocates one or more times slots for the first and second wireless communications. The method continues at step 808 where the processing module determines whether the wireless communication device is to further support a third and/or fourth wireless communications. If not, the method continues at step 810 where the processing module determines whether one or both of the first and second wireless communications have ended. If yes, the method continues at step 812 where the processing module de-allocates the antenna from the first and/or second wireless communications. If not, the method waits for the third and/or fourth communications to be initiated or for the first and/or second wireless communications to end.

When the third and/or fourth communications are initiated, the method continues at step 814 where the processing module selects a fourth antenna to transmit a first component of a second outbound signal of the third wireless communication, a fifth antenna to transmit a second component of the second outbound signal of the third wireless communication, and a third antenna to receive a second inbound signal of a fourth wireless communication. The method continues at step 816 where the processing module allocates time slots for the first, second, third, and fourth wireless communications. The method continues at step 818 where the processing module determines whether one of the wireless communication ends. If not, the method loops as shown. If yes, the method continues at step 806 after de-allocating antennas for the communications that have ended.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A distributed antenna system comprising:
   a plurality of antennas that are physically distributed in a pattern and having a distance between each of at least some of the plurality of antennas; and
   an antenna coupling circuit configured to:
      send a first component of an outbound signal of a first wireless communication to a first antenna of the plurality of antennas;
      send a second component of the outbound signal of the first wireless communication to a second antenna of the plurality of antennas; and
      receive an inbound signal of a second wireless communication from a third antenna of the plurality of antennas, wherein the third antenna is the distance from the first antenna and from the second antenna such that, in air, the outbound signal is attenuated at the third antenna.

2. The distributed antenna system of claim 1, wherein the antenna coupling circuit is further configured to:
   receive a second inbound signal of a third wireless communication from a fourth antenna of the plurality of antennas, wherein the fourth antenna is the distance from the first antenna and from the second antenna such that, in air, the outbound signal is attenuated at the fourth antenna.

3. The distributed antenna system of claim 1 further comprising:
   the first wireless communication is in accordance with a wireless local area network (WLAN) protocol; and
   the second wireless communication is in accordance with a wireless personal area network protocol.

4. The distributed antenna system of claim 1 further comprising:
   the first wireless communication is a transmit portion of a protocol specific communication on a first channel of a plurality of channels within a frequency band; and
   the second wireless communication is a receive portion of the protocol specific communication on a second channel of the plurality of channels.

5. The distributed antenna system of claim 1, wherein the antenna coupling circuit is further configured to:
   send a first component of a second outbound signal of a third wireless communication to a fourth antenna of the plurality of antennas;
   send a second component of the second outbound signal of the third wireless communication to a fifth antenna of the plurality of antennas; and
   receive a second inbound signal of a fourth wireless communication from a sixth antenna of the plurality of antennas, wherein the sixth antenna is the distance or a second distance from the fourth antenna and from the fifth antenna such that, in air, the second outbound signal is attenuated at the sixth antenna.

6. The distributed antenna system of claim 1, wherein the first, second, and third antennas comprising one of:
   a dipole antenna;
   a monopole antenna;
   a helical antenna; and
   a planar antenna.

7. The distributed antenna system of claim 1, wherein the antenna coupling circuit is further configured to:
   during a first time slot of a plurality of time slots:
      send the first component of the outbound signal to the first antenna;
      send the second component of the outbound signal to the second antenna; and
      receive the inbound signal from the third antenna; and
   during a second time slot of the plurality of time slots:
      send a first component of a second outbound signal of a third wireless communication to the first antenna;
      send a second component of the second outbound signal of the third wireless communication to the second antenna; and
      receive a second inbound signal of a fourth wireless communication from the third antenna.

8. The distributed antenna system of claim 1 further comprising:
   a transmit/receive isolation circuit configured, in response to a control signal, to isolate the outbound signal from the inbound signal.

9. A method for utilizing a distributed antenna system within a wireless communication device, the method comprising:
   determining, by one or more processing devices of the wireless communication device, that the wireless communication device is to concurrently support a first wireless communication and a second wireless communication;
   when the wireless communication device is to concurrently support a first wireless communication and a second wireless communication, selecting from a plurality of antennas:
      a first antenna to transmit a first component of an outbound signal of the first wireless communication;
      a second antenna to transmit a second component of the outbound signal of the first wireless communication; and
      a third antenna to receive an inbound signal of a second wireless communication, wherein the third antenna is a distance from the first antenna and from the second antenna such that, in air, the outbound signal is attenuated at the third antenna.

10. The method of claim 9 further comprising:
the first wireless communication is in accordance with a wireless local area network (WLAN) protocol; and
the second wireless communication is in accordance with a wireless personal area network protocol.

11. The method of claim 9 further comprising:
the first wireless communication is a transmit portion of a protocol specific communication on a first channel of a plurality of channels within a frequency band; and
the second wireless communication is a receive portion of the protocol specific communication on a second channel of the plurality of channels.

12. The method of claim 9 further comprising:
selecting from the plurality of antennas:
a fourth antenna to transmit a first component of a second outbound signal of a third wireless communication;
a fifth antenna to transmit a second component of the second outbound signal of the third wireless communication; and
a sixth antenna to receive a second inbound signal of a fourth wireless communication, wherein the sixth antenna is the distance or a second distance from the fourth antenna and from the fifth antenna such that, in air, the second outbound signal is attenuated at the sixth antenna.

13. The method of claim 9 further comprising:
during a first time slot of a plurality of time slots, selecting:
the first antenna to transmit the first component of the outbound signal;
the second antenna to transmit the second component of the outbound signal; and
the third antenna to receive the inbound signal; and
during a second time slot of the plurality of time slots, selecting:
the first antenna to transmit a first component of a second outbound signal of a third wireless communication;
the second antenna to transmit a second component of the second outbound signal of the third wireless communication; and
the third antenna to receive a second inbound signal of a fourth wireless communication.

14. A wireless communication device front end comprising:
one or more power amplifiers;
one or more low noise amplifiers; and
a distributed antenna system including:
a plurality of antennas that are physically distributed in a pattern and having a distance between each of at least some of the plurality of antennas; and
an antenna coupling circuit configured to:
receive an outbound signal of a first wireless communication from a power amplifier of the one or more power amplifiers;
send a first component of the outbound signal to a first antenna of the plurality of antennas;
send a second component of the outbound signal to a second antenna of the plurality of antennas;
receive an inbound signal of a second wireless communication from a third antenna of the plurality of antennas, wherein the third antenna is the distance from the first antenna and from the second antenna such that, in air, the outbound signal is attenuated at the third antenna; and
send the inbound signal to a low noise amplifier of the one or more low noise amplifiers.

15. The wireless communication device front end of claim 14, wherein the antenna coupling circuit is further configured to:
receive a second inbound signal of a third wireless communication from a fourth antenna of the plurality of antennas, wherein the fourth antenna is the distance from the first antenna and from the second antenna such that, in air, the outbound signal is attenuated at the fourth antenna; and
send the second inbound signal to a second low noise amplifier of the one or more low noise amplifiers.

16. The wireless communication device front end of claim 14 further comprising:
the first wireless communication is in accordance with a wireless local area network (WLAN) protocol; and
the second wireless communication is in accordance with a wireless personal area network protocol.

17. The wireless communication device front end of claim 14 further comprising:
the first wireless communication is a transmit portion of a protocol specific communication on a first channel of a plurality of channels within a frequency band; and
the second wireless communication is a receive portion of the protocol specific communication on a second channel of the plurality of channels.

18. The wireless communication device front end of claim 14, wherein the antenna coupling circuit is further configured to:
receive a second outbound signal of a third wireless communication from a second power amplifier of the one or more power amplifiers;
send a first component of the second outbound signal to a fourth antenna of the plurality of antennas;
send a second component of the second outbound signal to a fifth antenna of the plurality of antennas;
receive a second inbound signal of a fourth wireless communication from a sixth antenna of the plurality of antennas, wherein the sixth antenna is the distance or a second distance from the fourth antenna and from the fifth antenna such that, in air, the second outbound signal is attenuated at the sixth antenna; and
send the second inbound signal to a second low noise amplifier of the one or more low noise amplifiers.

19. The wireless communication device front end of claim 14, wherein the antenna coupling circuit is further configured to:
during a first time slot of a plurality of time slots:
send the first component of the outbound signal to the first antenna;
send the second component of the outbound signal to the second antenna; and
receive the inbound signal from the third antenna; and
during a second time slot of the plurality of time slots:
send a first component of a second outbound signal of a third wireless communication to the first antenna;
send a second component of the second outbound signal of the third wireless communication to the second antenna; and
receive a second inbound signal of a fourth wireless communication from the third antenna.

20. The wireless communication device front end of claim 14 further comprising:

a transmit/receive isolation circuit configured, in response to a control signal, to isolate the outbound signal from the inbound signal.

* * * * *